United States Patent [19]

Andersen

[11] Patent Number: 4,672,632
[45] Date of Patent: Jun. 9, 1987

[54] OPTIMIZED COMMUNICATIONS SYSTEM AND METHOD EMPLOYING CHANNEL SYNTHESIS AND PHASE LOCK DETECTION

[75] Inventor: Jorgen W. Andersen, Woburn, Mass.
[73] Assignee: Motorola, Inc., Schaumburg, Ill.
[21] Appl. No.: 576,850
[22] Filed: Feb. 3, 1984
[51] Int. Cl.$^4$ .............................................. H04B 3/14
[52] U.S. Cl. ........................................ 375/57; 375/18; 375/58; 375/81
[58] Field of Search ..................... 375/17, 18, 52, 53, 375/57, 58, 81; 329/50, 122; 332/9 R, 10, 16 R; 455/42, 44, 69; 370/24; 178/69 M, 69 N

[56] References Cited

U.S. PATENT DOCUMENTS

| | | | |
|---|---|---|---|
| 3,128,343 | 4/1964 | Baker | 375/53 |
| 3,337,864 | 8/1967 | Lender | 375/18 |
| 3,388,330 | 6/1968 | Kretzmer | 375/18 |
| 3,472,960 | 10/1969 | Gutlebor et al. | 375/57 |
| 3,679,977 | 7/1972 | Howson | 375/18 |
| 3,732,496 | 5/1973 | Boyer | 455/69 |
| 3,794,921 | 2/1974 | Unkauf | 375/57 |
| 3,806,815 | 4/1974 | Fletcher et al. | 375/81 |
| 3,946,337 | 3/1976 | Philips et al. | 332/22 |
| 3,973,201 | 8/1976 | Andren | 375/67 |
| 4,085,378 | 4/1978 | Ryan et al. | 329/124 |
| 4,087,628 | 5/1978 | Sanders et al. | 375/81 |
| 4,097,687 | 6/1978 | Yamaguchi | 375/18 |
| 4,121,166 | 10/1978 | Matsumoto et al. | 329/122 |
| 4,135,057 | 1/1979 | Bauless, Sr. et al. | 375/58 |
| 4,168,397 | 9/1979 | Bradley | 375/67 |
| 4,229,821 | 10/1980 | de Jager et al. | 375/53 |
| 4,298,986 | 11/1981 | Hughes | 375/84 |
| 4,314,206 | 2/1982 | Attwood et al. | 329/50 |
| 4,320,499 | 3/1982 | Muikwijk et al. | 375/17 |
| 4,361,894 | 11/1982 | Kurihara et al. | 375/80 |
| 4,475,217 | 10/1984 | Hughes | 329/122 |
| 4,507,794 | 3/1985 | Jones et al. | 375/58 X |

OTHER PUBLICATIONS

Principles of Data Communication; Lucky, Salz and Weldon, McGraw Hill, 1968, pp. 118-127.
Accatino et al., "A Quasi-Linear Microwave Transmitter for 4 φ-PSK Signals"; CSELT Rapporti Tecnici—vol. VIII, No. 1, Mar. 1980.
Miyakawa et al., "Digital Phase-Modulation ... Waveform"; Electronics and Communications in Japan, vol. 58-A, No. 12, Dec. 1975.
Lindsey et al., "Detection of Digital FSK and PSK ... Loop"; IEEE Transactions on Communications, vol. Com-25, No. 2, pp. 200-214, Feb. 1977.
Aulin et al., "MSK-Type Receivers for Partial ... Modulation"; IEEE International Conference on Communications—ICC 82, Phil., Jun. 13-17, 1982, pp. 6F.3.1-6F.3.6.
Rhodes, "FSOQ, A New Modulation Technique ... Envelope"; National Telecommunications Conference, Nov. 30-Dec. 4, 1980, Houston, Tex., pp. 51.1.1-51.1.7.
Klapper et al., "PLL Demodulation of Binary ... Environment"; International Conference on Communications, Denver, Colo., Jun. 14-18, 1981, pp. 34.5.1-34.5.5.
Hirt et al., "Suboptimal Reception of Binary CPSK Signals"; IEEE Proc., vol. 128, Pt. F No. 3, Jun. 1981, pp. 125-133.
Aulin et al., "Selecting Smoothing ... Digital FM"; IEEE Proc., vol. 128, Pt F., No. 4, Aug. 1981, pp. 237-244.
Aulin et al., "Bandwidth Efficient Digital ... Demodulation"; International Conference on Communications—ICC '79, Boston, MA, Jun. 10-14, 1979, pp. 42.4.1-42.4.6.

Primary Examiner—Benedict V. Safourek

[57] ABSTRACT

An optimized communications system and method, particularly for digital signals, employs overall channel synthesis for providing a desired overall time response. A channel transfer function defining a plurality of time response determining elements having values that provide the desired overall time response is selected, and the system is synthesized by allocating to the transmitter and to the receiver the time responds determining elements so as to provide a system transfer function that corresponds to the selected channel transfer function and so as to optimize preselected characteristics of the transmitter and the receiver. A carrier may be phase shift modulated in accordance with the digital signals so as to afford a predetermined phase change that extends over a complete bit interval, and a phase lock loop detector may be employed for demodulating the phase shift modulated carrier.

1 Claim, 18 Drawing Figures

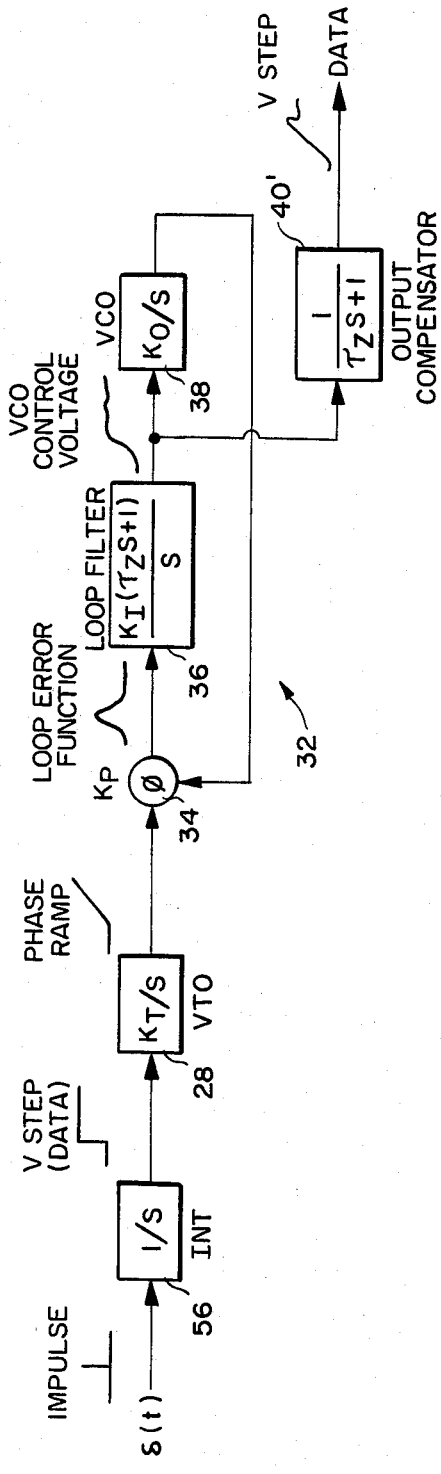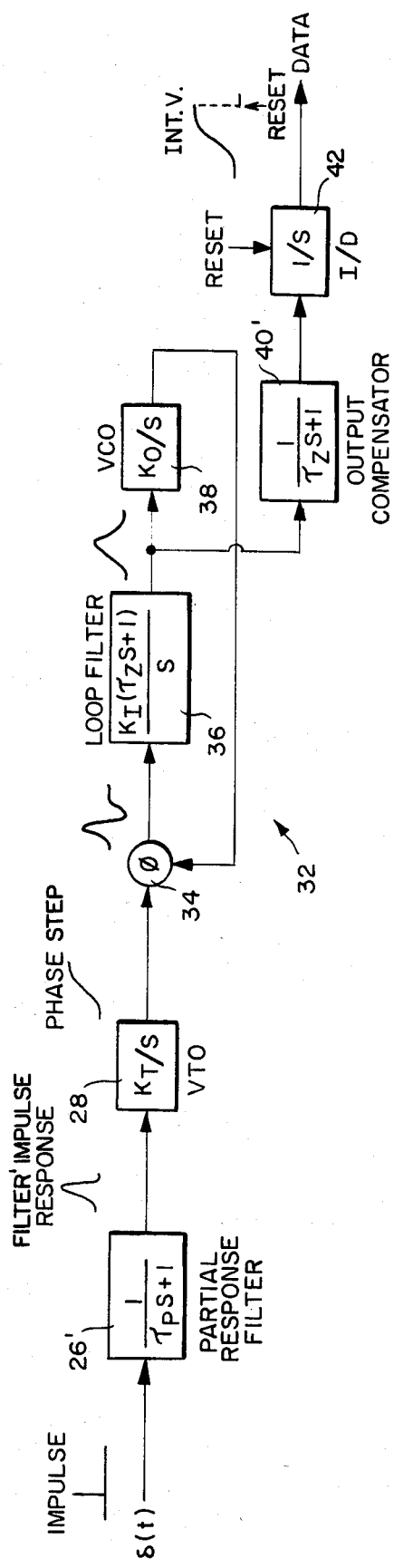

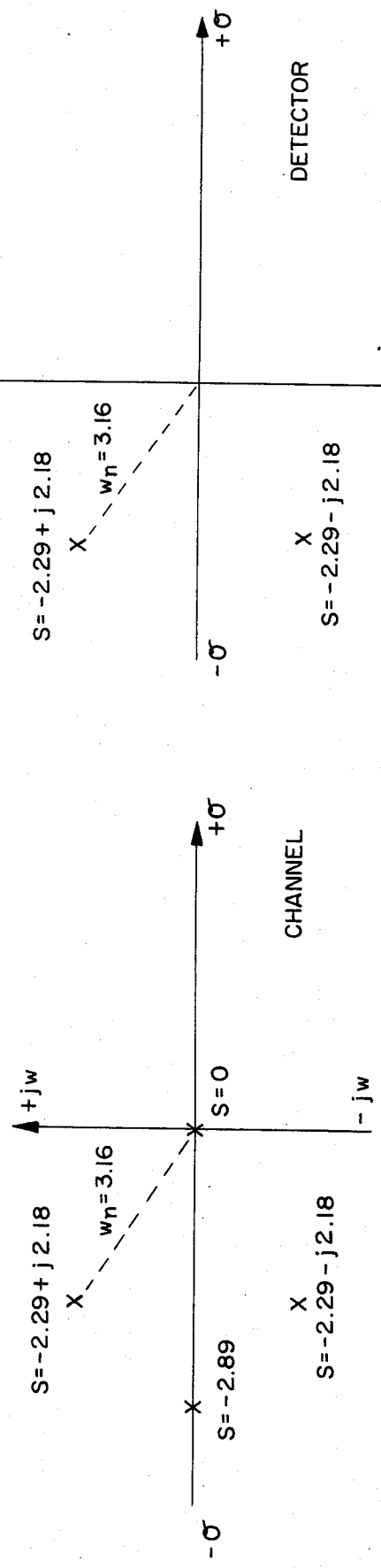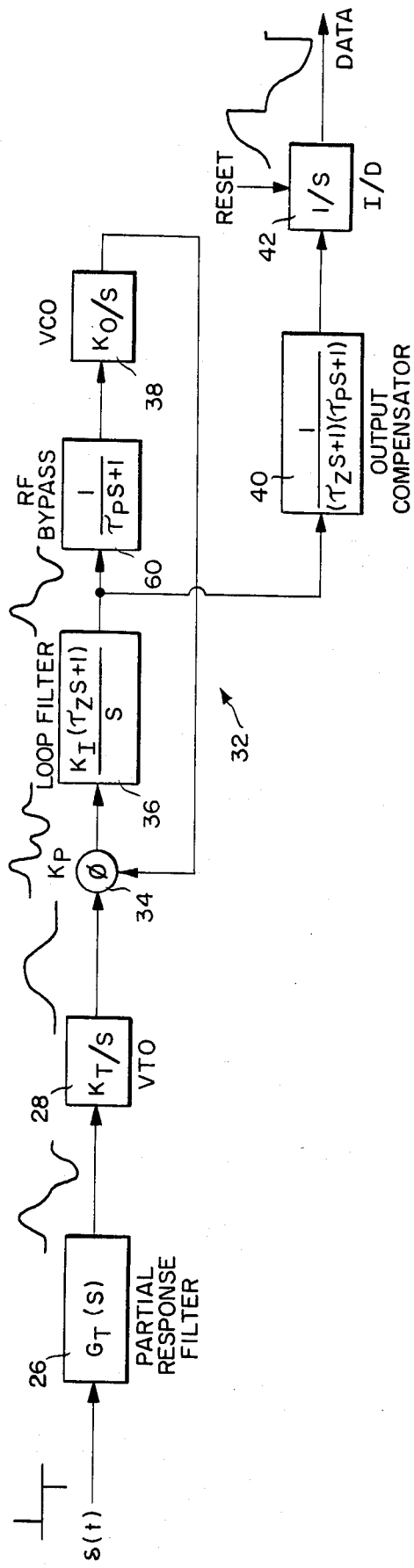
FIG. 5A.
FIG. 5B.
FIG. 6.

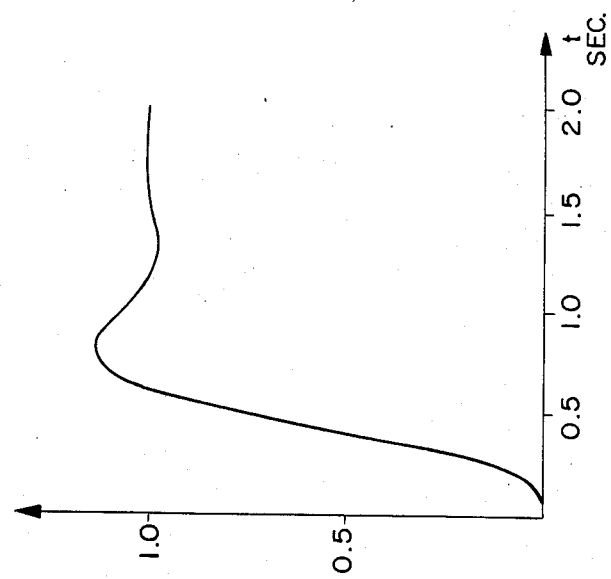
FIG. 10C.
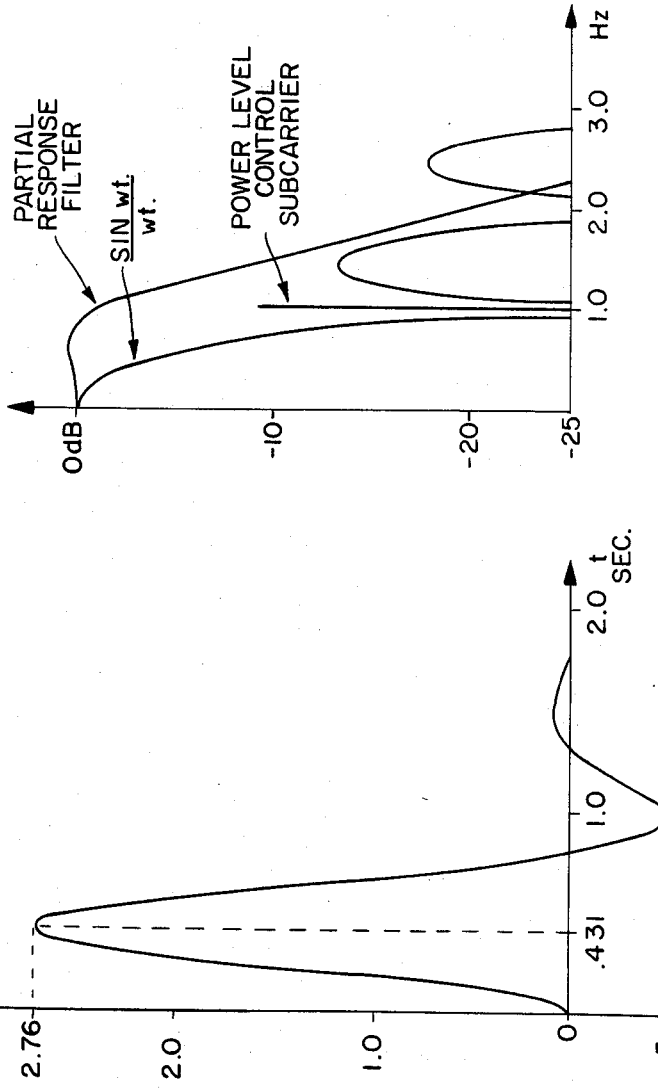
FIG. 10B.
FIG. 10A.

OPTIMIZED COMMUNICATIONS SYSTEM AND METHOD EMPLOYING CHANNEL SYNTHESIS AND PHASE LOCK DETECTION

BACKGROUND OF THE INVENTION

This invention relates generally to communications systems and methods, and more particularly to communications systems and methods for the transmission of analog and digital information which employ overall channel synthesis and optimized detection techniques.

There is an increasing demand for low cost, reliable, communications systems for the transmission and reception of various types of analog and digital information. The increasing use by business and industry of computers for recordkeeping and the need to communicate information between commonly-owned facilities, the proliferation of commercial time-shared data bases and data processing facilities which sell their services to multiple subscribers, the advent of electronic banking, and the need for monitoring remote processing operations, such as remote well logging in the oil industry, as well as a host of other communications requirements have all contributed to this demand. The types of information communicated, i.e., voice, video or data, the speeds at which the information is communicated, and the types of systems, i.e., digital or analog, used to communicate the information are quite varied.

Many systems operate over short distances, as in metropolitan areas, and may employ either dedicated private or leased lines or point-to-point radio. Dedicated lines offer the advantage of providing a transmission channel with well-defined transmission characteristics and which is free from extraneous interferences such as fading, multipath or co-channel interference. However, dedicated lines are expensive to install and maintain or lease and, when used for data transmission, must be conditioned to equalize group delay. Recent developments in microwave components for use in the higher frequency ranges of the microwave spectrum, e.g., K-band (12-24 GHz), where large signal bandwidths are available for high speed digital transmissions and where the use of small highly directive antennas provide significant system and cost benefits, have contributed to an increasing use of microwave radio to satisfy communications requirements. Communications systems employing microwave links, however, are not free of problems. The system must be designed to accommodate fading, multipath and other extraneous interferences. Also, provisions must be made to compensate for carrier frequency drift, and, depending upon the frequency at which it operates, microwave radio may be subject to bandwidth or power limitations which affect the information that may be transmitted by the system.

Communications systems, regardless of whether they are used for voice or data and regardless of whether they employ dedicated lines or radio, are increasingly operating with digital information. As is well-known, digital communications systems, in general, require specialized techniques and systems that are tailored to the specific characteristics of the information being transmitted, e.g., data rate, or to specific modulation parameters in order to afford acceptable levels of performance. In recent years, a great deal of effort has been expended in the field of information theory in attempts to develop digital transmission systems and techniques that approach optimum performance under particular conditions. For example, modulation techniques such as differential encoding schemes, which affect the manner in which information is modulated on to a carrier, and various coherent detection schemes involving correlation or matched filter processes have been developed in order to minimize the probability of error in the detection process. Other systems have been proposed which minimize the bandwidth required for transmitting digital information at a specified data rate and probability of error, as shown, for example, in U.S. Pat. No. 4,135,057 to Bayless, Sr. et al., which discloses transmitter pulse bandlimiting networks and receiver pulse shaping networks designed in accordance with matched filter theory for affording pulse outputs of a predetermined shape. Still other systems attempt to afford digital transmission rates through a channel of given capacity that are greater than the maximun rate predicted by Nyquist theory. For example, the so-called partial response signaling systems proposed by Kretzmer in U.S. Pat. No. 3,388,330 transmit data at twice the Nyquist rate over a channel that has a partial response that extends over more than one symbol interval, and compensate for the resulting intersymbol interference in the data detection process by sampling the data in a predetermined manner.

Although such systems and techniques have resulted in significant improvements in digital transmission, in general, digital communications systems tend to be complex, expensive and rather inflexible in that they must be tailored to specific data characteristics, such as bit rate, and modulation parameters. As a result, a system designed for a specific set of characteristics and parameters may not be readily adaptable to a different set of characteristics and parameters. Accordingly, such techniques do not necessarily afford low cost systems, nor do they necessarily result in systems that are optimum.

It is desirable to provide communication systems and methods which avoid the foregoing disadvantages, and it is to this end that the present invention is directed.

SUMMARY OF THE INVENTION

Broadly stated, in one aspect the invention affords an optimized communications system and method wherein the system as a whole is considered as a channel, a desired overall channel time response is specified, a channel transfer function which defines a plurality of time response determining elements having predetermined values that provide the desired overall time response is selected, and the system is synthesized by allocating to a transmitter means and a receiver means time response determining elements having values corresponding to the predetermined values of the time response determining elements of the channel transfer function in order to afford a system transfer function that corresponds to the channel transfer function. The time response determining elements are allocated between the transmitter means and to the receiver means so as to optimize preselected characteristics of the transmitter means and the receiver means.

Stated somewhat differently, the transmitter means may comprise a first network of time response determining elements having a first transfer function, and the receiver means may include detector means comprising a second network of time response determining elements having a second transfer function, the first and second transfer functions being selected so as to afford a desired overall time response and a predetermined power and bandwidth efficiency for the system.

In accordance with another aspect, the overall channel transfer function may define a plurality of networks of time response determining elements of predetermined values that provide the desired overall time response. The receiver means may be synthesized with a phase lock loop detector of order n by allocating to the phase lock loop detector those n networks of the plurality which minimize the phase lock loop detector noise bandwidth; and the transmitter may be synthesized by allocating thereto the remaining networks of the plurality.

The invention also affords an optimized digital communications system comprising means for phase shift modulating a carrier with digital signals corresponding to input data so as to produce predetermined carrier phase changes which extend over a preselected time interval, a phase lock loop detector for receiving the phase shift modulated carrier and for providing output signals corresponding to the phase shifts, the phase lock loop detector serving as a data estimator, and means responsive to the output signals from the phase lock loop for providing digital signals corresponding to the data.

The invention also provides an optimized communications system for digital signals comprising impulse generator means responsive to the digital signals for producing impulses, filter means having a predetermined impulse response for filtering the impulses, means for phase modulating a carrier with the filtered impulses, and receiver means for receiving the phase modulated carrier, the receiver means comprising phase lock loop detector means for providing phase signals corresponding to the carrier phase modulation, and means responsive to the phase signals for providing output signals corresponding to the digital signals.

BRIEF DESCRIPTION OF THE DRAWINGS

FIG. 2 is a functional block diagram of a communications system in accordance with the invention that employs frequency shift keying;

FIG. 4 is a functional block diagram of a communications system in accordance with the invention that employs a form of phase shift keying;

FIGS. 5A and 5B illustrate, respectively, the channel root locus and the detector root locus of the system of FIG. 4;

FIG. 6 is a functional block diagram of the system of FIG. 1;

FIGS. 10A-10C illustrate, respectively, the impulse response of the partial response filter, the frequency response of the partial response filter superimposed upon the frequency response of an impulse, and the phase step response of the VTO;

DESCRIPTION OF THE PREFERRED EMBODIMENTS

Figure 1:
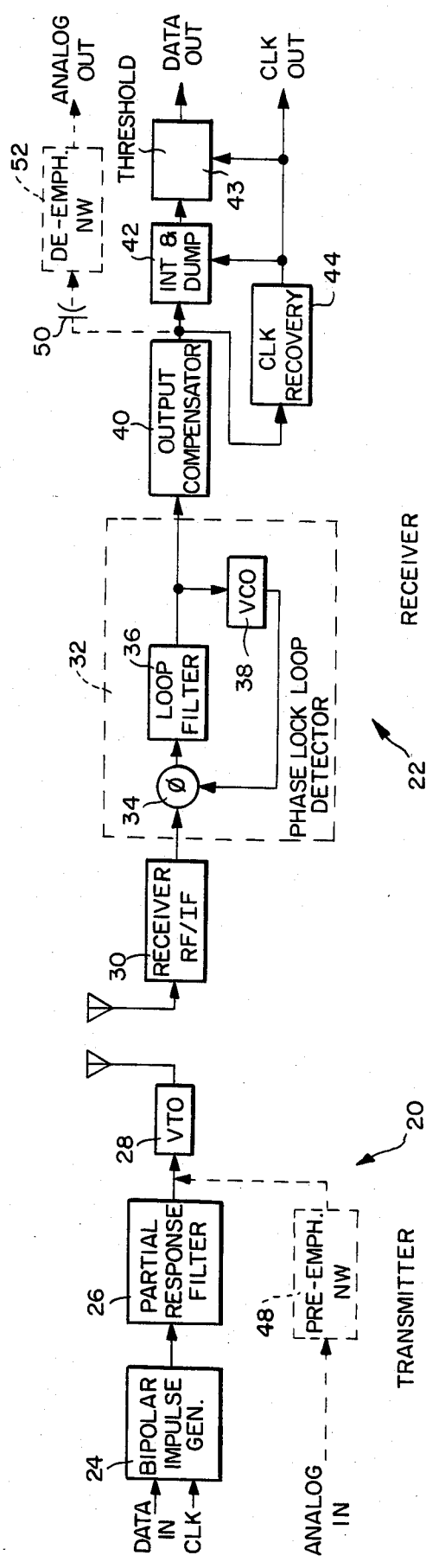
FIG. 1 is a simplified block diagram of a communications system in accordance with the invention.

The invention is particularly well adapted to digital communications systems and methods which employ a radio transmission channel, for example in the microwave frequency band, and will be described in that environment. However, this is illustrative of only one utility of the invention and, as will become apparent, the principles of the invention have wider applicability.

As previously indicated, the invention involves synthesizing a communications system by considering the overall system from the transmitter input to the receiver output as a composite channel, and forming the transmitter and the receiver so that they have transfer functions of particular character in order to afford desirable system parameters and characteristics and such that the overall system transfer function affords a desired time response. The transmitter and the receiver transfer functions need not have any special relationship to one another apart from being factors of the overall system transfer function. As will become apparent, this approach affords significant advantages. For example, by specifying the overall system time response, a large number of functions, such as tabulated filter functions, that afford the desired time response become available for synthesizing the system. Moreover, since an overall system transfer function G(s), where s is the complex S-plane variable, and G(s) is a linear time-invariant function, may be considered to be the product of a plurality of functions $G_1(s)$, $G_2(s)$ ... $G_n(s)$, each of which defines the pole and zero locations of a network of time response determining elements, the function G(s) may be considered as defining a plurality of concatenated networks. Since the function remains the same regardless of the order in which the networks are concatenated, the networks may be distributed throughout the system in any desired order. Thus, for any given function G(s) that provides the desired overall time response, the poles and zeros of the function may be allocated among the system compenents in any desired manner, thereby rendering it possible through appropriate allocation of the poles and zeros to optimize different system parameters and characteristics. The significance of this will become apparent shortly.

As will be described, a communications system in accordance with the invention preferably employs a phase lock loop (PLL) as a detector, and preferably employs a transmitter that comprises a voltage tuned oscillator (VTO). The system may operate with digital signals which angle modulate (either phase or frequency) the carrier produced by the VTO. However, as will be discussed hereinafter, it is preferable to apply the digital signals to the carrier as a form of phase shift modulation, as this affords significant detector noise bandwidth performance advantages. As will also be discussed shortly, the use of a phase lock loop detector affords significant advantages over other types of detectors. Among these advantages are included threshold extension which enables operation at lower carrier to noise ratios, carrier tracking which reduces system complexity and frequency stability requirements, and easy adaptability to different modulation rates and types. The VTO carrier may be any convenient frequency, and the system may employ either a radio or a transmission line link.

FIG. 1 is a simplified block diagram of a digital communications system in accordance with the invention, comprising a transmitter 20 and a receiver 22. In the transmitter, digital data (the term "data" being used herein broadly to refer to not only data, per se, but also to other types of information, e.g., voice), and clock are input to a bipolar impulse generator 24, the output of which is filtered by a partial response filter 26 and supplied to the control voltage input of a VTO 28. The signals from the partial response filter modulate the VTO carrier, and the modulated carrier is transmitted to the receiver as, for example, a radio wave.

In the receiver, the modulated carrier may be downconverted by RF and IF circuits 30 to a convenient IF frequency. The IF frequency may be applied to a phase lock loop detector 32 comprising a phase detector 34, a loop filter 36 and voltage controlled oscillator (VCO) 38. The output of the loop may be taken from the control voltage input to the VCO, as shown, and supplied through an output compensator circuit 40 to an integrate and dump (I/D) circuit 42 and to a threshold circuit 43 which outputs the data. The output from the output compensator may also be applied to a clock recovery circuit 44. The recovered clock is output from the clock recovery circuit and may be employed for resetting the I/D circuit 42. The phase lock loop serves as a data estimator, and the I/D and threshold circuits serve as a data correlator.

There are many applications where it is desirable to employ a communications system for transmitting both digital and analog information, e.g., voice as during system set-up. The system of FIG. 1 advantageously enables both types of information to be transmitted readily using many of the same basic system components without modification. As shown in phantom lines, analog information may be input to a conventional pre-emphasis network 48, and the output of the network may be fed directly to the control voltage input of the VTO 28 to frequency modulate the VTO carrier. In the receiver, the PLL may be employed, without change, for demodulating the FM carrier. The output from the output compensator may be AC coupled through a capacitor 50 to a conventional de-emphasis network 52, which outputs the demodulated analog information.

In order to facilitate a better understanding of the invention, it is appropriate at this point to present some of its underlying principles prior to describing the system of FIG. 1 in more detail. This will be done by first describing generally the application of the invention to systems that employ FSK and PSK modulation formats and phase lock loop detection. Then the application of the principles of the invention to the system of FIG. 1 will be described.

FIG. 2 is a functional block diagram of a communications system employing frequency shift keying (FSK) and a Type II (zero position error) second-order (two poles) phase lock loop 32 as a data detector. The figure also illustrates the waveforms at various points in the system. Since binary data may be considered to be the integration of bipolar impulses, wherein a 1 may be represented as a positive impulse, for example, and a 0 may be represented as a negative impulse, the input to the system is illustrated as a unit impulse function $\delta(t)$ that is integrated in an integrator 56 having a transfer function 1/s to produce a voltage (or current) step output that is used to modulate VTO 28. Since the VTO may be considered as a form of integrator having a transfer function $K_T/s$, where $K_T$ is the VTO gain constant having dimensions of radians (or degrees) per volt-second, the output from the VTO is a phase ramp, as shown. The phase ramp is applied to one input of phase detector 34, which may have a gain constant $K_P$ dimensioned in volts/radians, of the PLL. As shown, loop filter 36 of the PLL may have a transfer function $K_I(\tau_Z s + 1)/s$, and VCO 38 may have a transfer function $K_o/s$. $K_I$ and $K_o$ have dimensions of volts/volt-sec. and rad./volt-sec., respectively. The output of the loop may be taken as the VCO control voltage from the loop filter. Output compensator 40' is preferably formed to have a transfer function $1/(\tau_Z s + 1)$ in order to cancel the zero that appears in the loop filter transfer function, for reasons which will be discussed shortly.

For the loop of FIG. 2, the open loop function is $$G(s) = \frac{K_P K_I K_o(\tau_Z s + 1)}{s^2} \quad (1)$$

The closed loop function is $$GH(s) = \frac{K_P K_I K_o(\tau_Z s + 1)}{s^2 + K_P K_I K_o \tau_Z s + K_P K_I K_o} \quad (2)$$

where H=1 for the illustrated loop.

The output of the loop (at the output of the loop filter) is $$F(s) = GH(s) \times \frac{s}{K_o} \quad (3)$$

$$= \frac{K_P K_I s(\tau_Z s + 1)}{s^2 + K_P K_I K_o \tau_Z s + K_P K_I K_o}$$

Since the loop zero that appears in the signal path due to the loop filter is cancelled by the output compensator, the output of the output compensator is $$F'(s) = F(s) \times \frac{1}{\tau_Z s + 1} \quad (4)$$

$$= \frac{K_P K_I s}{s^2 + K_P K_I K_o \tau_Z s + K_P K_I K_o}$$

Phase lock loops as data detectors exhibit two different noise bandwidths. The loop noise bandwidth, which is determined from the closed loop function GH(s), is primarily of concern with respect to the minimum carrier to noise ratio to maintain lock. The loop noise badnwidth is the area under the curve of $|H(j\omega)|^2$ of GH(s). The other noise bandwidth of interest is the detector noise bandwidth, which determines the detected signal to noise ratio. The detector noise bandwidth at the output of the loop filter is the area under the curve of $|H(j\omega)|^2$ of F(s) of equation (3), and the detector noise bandwidth at the output of the output compensator is the area under the curve of $|H(j\omega)|^2$ of F'(s) of equation (4). By using the output compensator to cancel the loop zero due to the loop filter, the detector noise bandwidth is reduced and an improvement in detected signal to noise ratio is afforded.

However, the noise performance of a phase lock loop data detector is the consequence of choosing a given time response for the detector, since noise performance becomes unimportant if the "eye pattern" of the detected data is closed. Therefore, the PLL should have a time response which optimizes detector efficiency by minimizing the carrier to noise ratio for a given bit error rate (BER). This is accomplished by optimizing both detector transient response from an intersymbol interference stand point as well as detector noise bandwidth. In accordance with the invention, the PLL may be synthesized to afford the desired time response by equating the coefficients of the denominator of F'(s) of equation (4) with those of any of a number of functions, for example, filter functions, having an inverse transform that affords the desired response.

To illustrate, in order to synthesize a loop having a 10% settling time, a second-order Bessel filter function may be selected (Bessel functions being known for their good transient response), and the loop pole locations may be determined by frequency scaling the poles of the filter function for a 10% to 90% rise-time of 1 second. The function is of the form $$B(s) = \frac{1}{D(s)} = \frac{1}{s^2 + 2\zeta\omega_n s + \omega_n^2} \quad (5)$$

where the roots of the denominator function D(s) are $$s_{1,2} = \sigma \pm j\omega d = -\zeta\omega_n \pm j\omega_n \sqrt{1 - \zeta^2} \quad (6)$$

which represent complex conjugate poles. The poles of the second-order filter function may be found from tabulated values of Bessel filter functions to be $$s_{1,2} = -2.364249 \pm j1.365$$

which provide a denominator function $$D(s) = s^2 + 4.728498s + 7.4528983$$

wherein $\omega_n = 2.73$, and $$\zeta = \frac{\sigma}{\omega_n} = 0.8660254.$$

The loop noise bandwidth may be determined from the closed loop function GH(s) given by equation (2) as follows. For convenience, letting $K_p$ and $K_o = 1$, and equating the coefficients of D(s) and the denominator of equation (2), the values of the various constants may be found to be $K_I = 7.4528983$ volts/volt-sec., $\tau_Z = 4.728498/K_I = 0.63445089$ sec., and $\omega_Z = 1/\tau_Z = 1.5761661$ rad./sec.

Figure 3A:
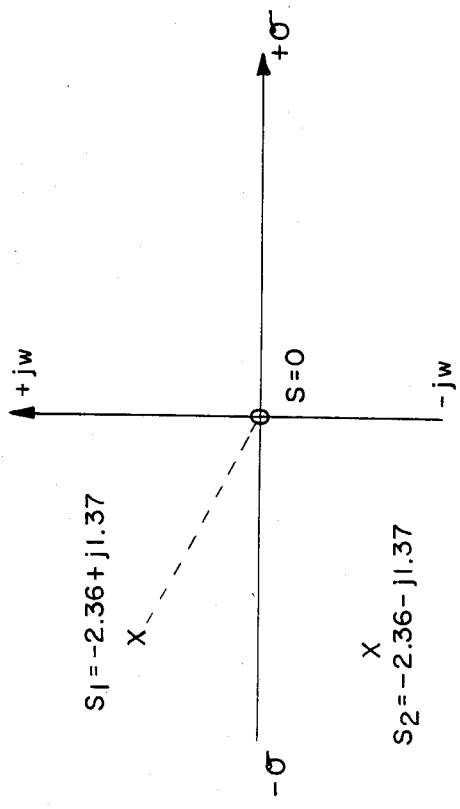
FIGS. 3A and 3B illustrate, respectively, the closed loop root locus of the phase lock loop of the system of FIG. 2 and the detector root locus of the system.

FIG. 3A illustrates the closed loop root locus of GH(s), from which the loop noise bandwidth may be found by numerical integration of $|H(j\omega)|^2$ to be 1.576 Hz.

Figure 3B:
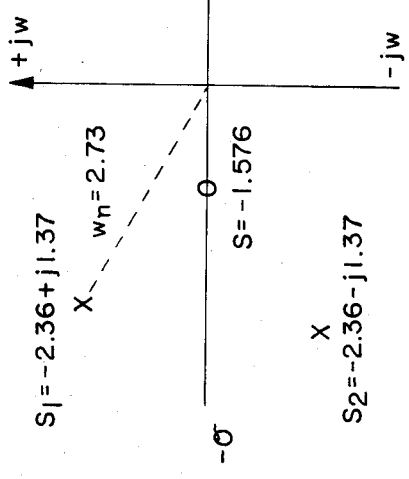

The root locus for the signal path at the output of the output compensator may be similarly determined from F'(s) of equation (4). Since the denominators of equations (2) and (4) are the same, the poles are the same. However, as shown in FIG. 3B, the root locus is quite different due to the presence of a zero at the origin. The detector noise bandwidth of the loop may be found by numerical integration of $|H(j\omega)|^2$ of F'(s) to be 2.936 Hz. Thus, the detector noise bandwidth is somewhat greater than the loop noise bandwidth, which is not unexpected since the zero of GH(s) is displaced from the origin (FIG. 3A), whereas the zero of F'(s) is not (FIG. 3B). Although the loop zero in the signal path due to the loop filter was easily cancelled by the output compensator, the zero at the origin, which contributes significantly to the detector noise bandwidth, is inherent in the phase lock loop as a frequency detector since it must be a phase differentiator. This zero may not be cancelled to afford reduced detector noise bandwidth by using post-detection filtering (on the output of the output compensator), since in order to maintain the desired time response, if any other poles are placed in the data path, the loop bandwidth must be opened. This increases the loop noise bandwidth and consequently requires an increase in received carrier power in order to maintain lock.

An improvement in noise performance may be obtained by employing phase shift keying (PSK) modulation rather than frequency shift keying (FSK) modulation. However, phase shift keying the VTO of FIG. 2 is equivalent to driving the VTO control voltage input directly with the impulses related to the data so that the output of the VTO becomes a phase step. Not only does this increase the transmitted RF spectrum bandwidth from the VTO and, therefore, require wider RF and IF bandwidths in the receiver, but since the phase steps are also applied to phase detector 34 of the PLL, the phase detector is required to process large instantaneous phase changes which could well exceed its dynamic range and cause the loop to lose lock. Accordingly, the modulation index, i.e., phase change, must be limited to a range which the phase detector can handle. However, reduced phase shifts result in a degradation in detected signal to noise ratio. Although a so-called "extended range" phase detector capable of handling large phase changes may be employed, such detectors perform poorly under low carrier to noise conditions and are unsuitable in a loop employed for threshold extension. Sinusoidal phase detectors, e.g., mixers, perform well in low carrier to noise environments, but they have a limited instantaneous phase error dynamic range of the order of $\pm \pi/6$ radians. For these reasons, in the past phase lock loops generally have not been employed directly as PSK data detectors, i.e., data estimators, nor have they been employed as FSK data detectors except in modems and the like where rather high carrier to noise ratios are present.

The invention avoids these disadvantages by employing a phase lock loop, as a data detector, that utilizes a sinusoidal-type phase detector, thereby taking advantage of the threshold extension properties of the loop, and by constraining the carrier phase shift to occur continuously over a complete bit, i.e., symbol, interval so as to maintain the phase change within the dynamic range of the phase detector. This is accomplished by disposing the partial response filter 26 between the VTO and the data-related impulses, as shown in FIG. 4. The partial response filter limits the time response of the voltage applied to the VTO such that the carrier phase change applied to the phase detector 34 extends over a complete bit interval and remains within the dynamic range of the phase detector. In addition, since the phase lock loop is now employed for detecting phase shifts rather than frequency shifts, the integrate and dump circuit 42 at the output of output compensator 40' may be advantageously employed to cancel the loop zero at the origin which appears in equation (4), thereby improving the detector noise bandwidth.

To illustrate the improvement, the system of FIG. 4 may be synthesized using a third-order Bessel filter function (the third real axis pole being in the partial response filter) normalized for an overall 10% to 90% risetime of 1 second. FIGS. 5A and 5B illustrate, respectively, the root locus of the overall channel and the root locus of the detector, from which the loop noise bandwidth may be found to be 1.692 Hz and the detector noise bandwidth may be found to be 0.54 Hz. Although the loop noise bandwidth is slightly larger than that of the FSK channel of FIG. 2, the detector noise bandwidth is significantly smaller, and the PSK channel of FIG. 4 provides an overall improvement in noise performance of the order of 7.05 dB.

The system of FIG. 4 represents the synthesis of a third-order channel. However, since the partial response filter is only of first order, the system may still be somewhat restrictive as to the maximum permissible phase modulation index which may be used without exceeding the dynamic range of the phase detector. Accordingly, it is preferable to employ a partial response filter of a higher order. This will not only permit a higher modulation index, it will also afford better suppression of transmitter sidelobes and enhance the spectral efficiency of the system.

The phase lock loop serves not only as a data detector, but also as a carrier tracking loop. In order to permit the loop to operate at convenient IF frequencies and with convenient data rates, the VCO 38 of the loop is preferably a varactor tuned oscillator, which typically requires an RF bypass at its tuning voltage input. This bypass, along with the source resistance of the VCO driver, invariably forms a third open loop real axis pole that is committed to the receiver. This pole is preferably taken into consideration in the synthesis so that the PLL becomes a third-order loop. Thus, for a partial response filter of order two (representing a pair of complex conjugate poles) and a third-order loop, the minimum channel synthesis is preferably of fifth-order.

As noted earlier, there is a plurality of different functions which may be selected for synthesizing the channel. In general, the selected function may comprise both poles and zeros and may be of any order. However, for the preferred embodiments of the invention described herein, the selected function is preferably a minimum phase function (one having no zeros). Tabulated filter functions, e.g., Bessel, Butterworth-Thompson, etc., provide convenient classes of functions from which to select a function for synthesizing the channel. Different functions as well as functions of different orders may be appropriate for optimizing different system parameters and characteristics. Moreover, as noted above, since the channel function may be considered to be the product of a number of different functions (i.e., as a plurality of concatentated networks of time response determining elements), the poles of the selected function may be allocated among the time response determining elements of the system in any desired order, without changing the function. Accordingly, by appropriately allocating the poles to different system components, the characteristics of the components may be controlled in desired ways. This will be illustrated by an example of a seventh-order channel synthesis of the system of FIG. 1. Then, an actual embodiment of a communications system embodying this synthesis will be described.

FIG. 6 is a functional block diagram of the system of FIG. 1 employing binary data, phase modulation of the VTO 28, and a third-order phase lock loop 32 that includes the real axis pole produced by an RF bypass 60 for VCO 38. The output of the loop may be taken at the output of the loop filter 36, and the output compensator 40 may be formed with two poles to cancel the two loop zeros in the signal path due to the loop filter and the RF bypass, as will be described. The integrate and dump circuit 42 on the output of the output compensator has a transfer function of 1/s as shown.

To illustrate the invention, the system will be synthesized using a seventh-order Bessel filter function scaled to afford a 1% settling time response. This function has one real axis pole and three pairs of complex conjugate poles. Since the RF bypass for the VCO commits a real axis pole to the receiver, i.e., the PLL, the real axis pole of the Bessel filter function is likewise committed to the receiver. One of the three pairs of complex conjugate poles may also be allocated to the receiver, and the remaining two pairs of complex conjugate poles may be allocated to the partial response filter 26, making this filter a fourth-order filter. FIG. 6 illustrates the waveforms at various points in the system for a 1-0 data sequence into the bipolar impulse generator of FIG. 1. The generator may output a positive impulse for a "1" and a negative impulse for a "0" to the partial response filter.

Assuming $K_P$ and $K_o = 1$, the open loop function for the third-order phase lock loop 32 is $$G(s) = \frac{K_I(\tau_Z s + 1)}{\tau_P s^3 + s^2} \tag{7}$$

And the closed loop function is $$GH(s) = \frac{K_I \omega_P(\tau_Z s + 1)}{s^3 + \omega_P s^2 + \omega_P K_I \tau_Z s + \omega_P K_I} \tag{8}$$

where $\omega_p = 1/\tau_p$.

The function representing the output of the loop at the input of output compensator 40 is $$F(s) = GH(s) \times (\tau_P s + 1) \times s \tag{9}$$

$$= \frac{K_I \omega_P s(\tau_Z s + 1)(\tau_P s + 1)}{s^3 + \omega_P s^2 + \omega_P K_I \tau_Z s + \omega_P K_I}$$

and the function representing the output of the I/D circuit 42 is $$F(s) = \frac{K_I \omega_P}{s^3 + \omega_P s^2 + \omega_P K_I \tau_Z s + \omega_P K_I} \tag{10}$$

since the output compensator and the I/D circuit cancel the zeros in equation (9).

The equation for a seventh-order Bessel filter function is of the form $B(s) = 1/P(s)$, where $P(s)$ is a seventh-order polynominal that may be factored into the product of seven terms, each representing a pole. The following pole values, normalized for $tg\omega 1$ sec., may be obtained from tabulated values of this function (See, for example Weinberg, L., *Network Analysis and Synthesis*, McGraw-Hill, New York, 1962):

| Poles | | $\omega_n$ | $\zeta$ |
|---|---|---|---|
| $s_1$ | $= -4.9717869$ | | |
| $s_{2,3}$ | $= -4.7582905 \pm j1.7392861$ | 5.0662061 | 0.93922165 |
| $s_{4,5}$ | $= -4.0701392 \pm j3.5171740$ | 5.379270 | 0.75663411 |
| $s_{6,7}$ | $= -2.6856769 \pm j5.4206941$ | 6.0495276 | 0.44394819 |

The 1 to 99% risetime may be determined from the inverse transform H(t) of B(s) using the above pole values by determining the time required for H(t) to increase from a value of 0.01 to value of 0.99. The times at which H(t) reaches these values can be determined to be 0.3999 seconds and 1.612 seconds, respectively, which gives a risetime of 1.2121 seconds. To scale the function for a 1% risetime in one second (1% settling), the pole values are multiplied by 1.2121. This gives a scaled set of values as follows:

| Poles | | $\omega_n$ | $\zeta$ |
|---|---|---|---|
| $s_1$ | $= -6.0263029$ | | |
| $s_{2,3}$ | $= -5.7675239 \pm j2.1081886$ | 6.1407484 | 0.93922165 |
| $s_{4,5}$ | $= -4.9334157 \pm j4.2631666$ | 6.5202131 | 0.75663411 |
| $s_{6,7}$ | $= -3.2553089 \pm j6.5704233$ | 7.3326324 | 0.44394819 |

If it is desired to synthesize the system to optimize the output signal to noise ratio from the receiver (which is the usual case), it is necessary to determine which group of three of the poles minimizes the detector noise bandwidth. Since it is already known that the real axis pole $s_1$ is committed to the receiver (because of the RF bypass on the VCO input), it thus remains to determine which one of the three pairs of complex conjugate poles in combination with $s_1$ minimize the detector noise bandwidth. This is accomplished by determining the third-order functions representing the product of the real axis pole $s_1$ and each pair of complex conjugate poles $s_{2,3}$, $s_{4,5}$ and $s_{6,7}$. The coefficients of the resulting third-order equations may then, in turn, be equated with the coefficients of the denominator D(s) of equation (10) in order to determine the values of the various constants, and the detector noise bandwidth may be calculated by numerical integration of $|H(j\omega)|^2$ of F'(s).

Synthesizing the loop with poles $s_{1,2,3}$ produces the third-order function $$s^3 + 17.561349s^2 + 107.22247s + 227.24459 \tag{11}$$

Equating coefficients gives the following values $$\omega_P = 17.561349$$

$$K_I = 12.940041$$

$$\tau_Z = 1/\omega_Z = 0.47183728$$

Numerical integration of $|H(j\omega)|^2$ of equation (10) using the above values gives a detector noise bandwidth of 0.5935 Hz. Repeating this process for $s_{1,4,5}$ and for $s_{1,6,7}$ gives detector noise bandwidths of 0.65671 Hz and 1.0949 Hz, respectively.

Since the combination of poles $s_{1,2,3}$ produces the smallest detector noise bandwidth, the loop will be synthesized using these poles, and the remaining four poles $s_4$–$s_7$ will be allocated to the partial response filter. Numberical integration of $|H(j\omega)|^2$ of GH(s) of equation (8) for poles $s_{1,2,3}$ gives a loop noise bandwidth of 1.70163 Hz.

Having determined that the combination of poles $s_{1,2,3}$ minimizes detector noise bandwidth, the loop filter, the RF bypass for the VCO, and the output compensator may now be synthesized. This is accomplished by first rewriting the closed loop equation (8) without the assumption of $K_P$ and $K_o = 1$ as $$GH(s) = \frac{\omega_P K_P K_I K_o (\tau_Z s + 1)}{s^3 + \omega_P s^2 + \omega_P K_P K_I K_o \tau_Z s + \omega_P K_P K_I K_o} \tag{12}$$

As before, the various constants in the above equation may be determined by equating coefficients of the denominator with those of equation (11) representing the product of poles $s_{1,2,3}$. Since equation (11) is normalized for a bit rate of 1 bit per second, the equation may first be frequency scaled, in a well-known manner, for a desired bit rate. Assuming a bit rate of 1.544 Mb/sec. ($\omega_P = 2.7114722 \times 10^7$ rad/sec.), equation (11) becomes $$s^3 + 2.7114722 \times 10^7 s^2 + 2.556115 \times 10^{14} s + 8.364412 \times 10^{20} \tag{13}$$

Figure 7:
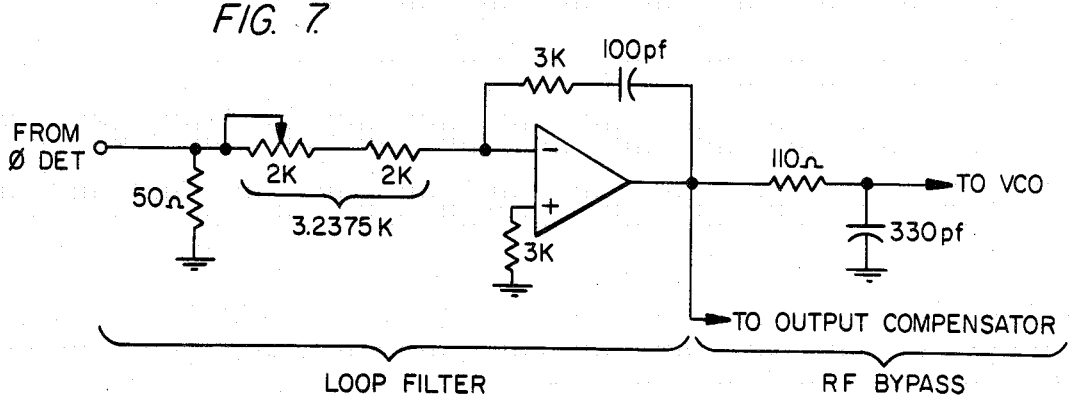
FIG. 7 illustrates a loop filter and an RF bypass network synthesized in accordance with the invention.

The gain constants $K_P$ and $K_o$ for the phase detector and the VCO, respectively, may be determined by measuring the actual phase detector and VCO employed. Knowing these values and $\omega_P$, the values of $K_I$, $\tau_Z$ and $\omega_Z$ may be readily determined. FIG. 7 illustrates an implementation of the scaled loop filter (synthesized as an active filter) and the RF bypass network.

Using the normalized values of $\omega_P = 17.561349$ rad/sec. and $\omega_Z = 2.1193746$ rad/sec., the output compensator may be synthesized in a well-known manner from the normalized equation $$s^2 + 19.680723s + 37.219078 \tag{14}$$

Figure 8A:
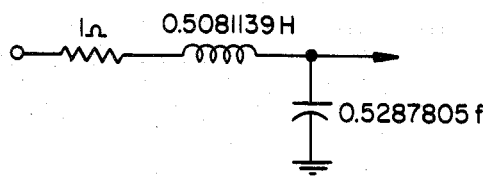
FIG. 8A illustrates an output compensator normalized for an impedance of 1 ohm and a bit rate of 1 b/sec.
Figure 8B:
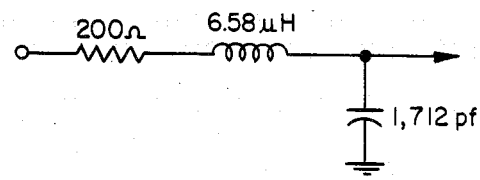
FIG. 8B shows the output compensator scaled for a 200 ohm impedance and a bit rate of 1.544 Mb/sec.

FIG. 8A illustrates a synthesis of the output compensator normalized for an impedance of 1 ohm and a bit rate of 1 b/sec. FIG. 8B shows the output compensator impedance and frequency scaled for a 200 ohm impedance and a bit rate of 1.544 Mb/sec.

Since poles $s_{1,2,3}$ have been allocated to the receiver, the partial response filter is synthesized as a fourth-order filter from a function of the form $G_r(s) = 1/D(s)$, where D(s) is the product of poles $s_4$–$s_7$. This product yields the normalized equation $$s^4 + 16.377449s^3 + 160.51984s^2 + 807.30189s + 2285.8\text{-}272 \tag{15}$$

Figure 9A:
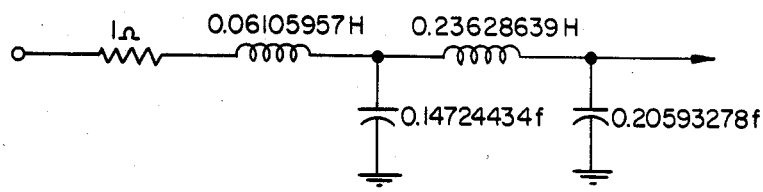
FIGS. 9A and 9B illustrate, respectively, a normalized and a frequency and impedance scaled partial response filter.
Figure 9B:
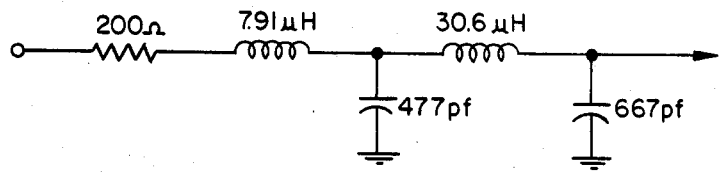

FIG. 9A illustrates the partial response filter synthesized in a well-known manner from the reciprocal of the above equation, and is normalized for an impedance of 1 ohm and 1 b/sec. Equation (14) may be impedance and frequency scaled for a desired impedance and bit rate. FIG. 9B illustrates the partial response filter scaled for an impedance of 200 ohms and a bit rate of 1.544 Mb/sec.

FIGS. 10A–C illustrate, respectively, the impulse response of the partial response filter, the frequency response of the partial response filter superimposed upon the $\sin \omega t/\omega t$ impulse frequency spectrum, and the phase step response of the VTO. FIGS. 10A–C are normalized for 1 b/sec. As shown in these figures, the partial response filter not only limits the phase step output of the VTO, thus limiting the phase step applied to the phase detector, it also significantly reduces the sidelobes of the transmitted RF spectrum and thus affords improved bandwidth efficiency for the system.

In the foregoing example, the poles of the selected seventh-order Bessel function were allocated between the transmitter and the receiver so as to minimize detector noise bandwidth. If instead of minimizing detector noise bandwidth it had been desired to minimize the RF transmitted bandwidth as, for example, to minimize co-channel interference, the partial response filter could have been synthesized using the four poles which optimize the filter response, and the remaining poles could have been allocated to the receiver. Moreover, although the above example was illustrated for a seventh-order Bessel function and for a 1% settling time, other types of functions, e.g., Butterworth-Thompson, as well as higher-order functions and other time responses could have been selected. For example, a smaller percent settling time would have afforded a better time response, but would have opened the detector bandwidth and would have resulted in poorer performance under low carrier to noise conditions. Conversely, a higher percent settling time would have resulted in a poorer time response, but a smaller detector noise bandwidth. The significant aspect is that the invention enables consideration of the system as a whole from the transmitter input to the receiver output as a composite channel, selection of a function to provide a desired time response which affords desirable characteristics for the system components, and synthesis of the system by allocating the poles and the zeros of function among the system components so as to optimize the performance characteristics of the system. Since time response and frequency response are, of course, related, in some cases it may be more convenient to define the response of a channel in terms of frequency, as, for example, where it is desired to optimize an analog system for uniform group delay. However, the system may be synthesized in the same way as described.

Figure 11:
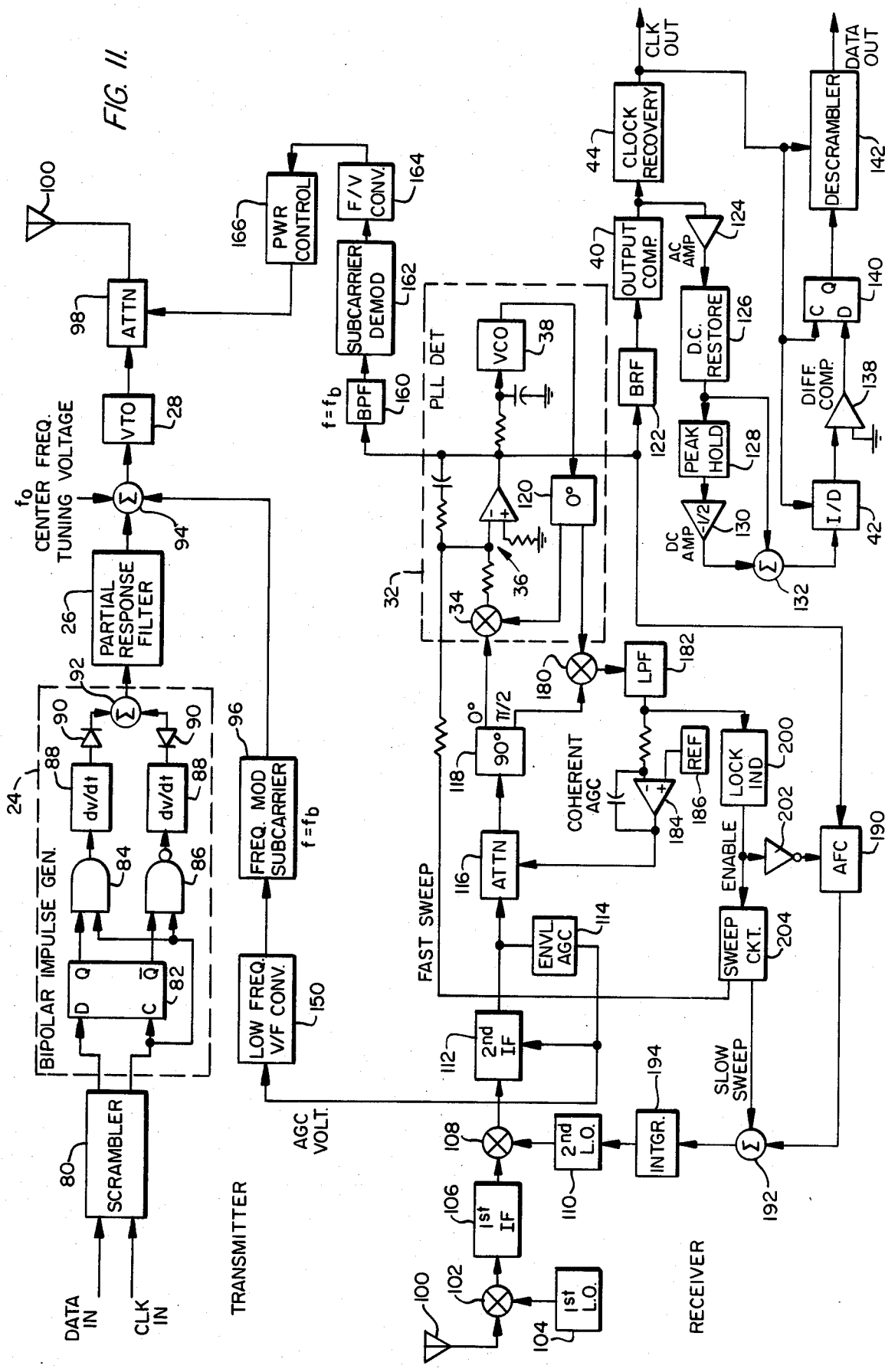
FIG. 11 is a detailed block diagram of a system in accordance with the invention.

FIG. 11 is a block diagram illustrating a system in accordance with the invention in more detail. (The system illustrated in the figure is actually a transceiver, i.e., a transmitter-receiver combination, that may constitute one end of a communications link, and the other end of the link may employ a similar transceiver (not shown) for affording a duplex channel. For purposes of the following description, it will be assumed that this is the case.) The system of FIG. 11 is particularly well adapted for transmitting wide band data over a point-to-point radio link, e.g., in the K-band region of the microwave spectrum. Systems operating at such frequencies are generally power limited rather than bandwidth limited, and must be designed to accommodate rather large rain fades. Moreover, such systems are inherently short haul systems and may be used for communicating a variety of different types of data. Accordingly, they are preferably low cost systems which can be readily optimized for different types of data and for different data rates. The system of FIG. 11 satisfies the foregoing objectives and affords a number of other advantages, as will become apparent from the description that follows.

As shown, in the transmitter, data and clock may be input to the bipolar impulse generator 24 through a scrambler 80, the purpose of which will be described shortly. Bipolar impulse generator 24, which, as illustrated, is arranged to operate with binary data, may comprise a flip flop 82 driving a pair of logic gates 84, 86 which are clocked by the input clock frequency. The outputs of the logic gates are differentiated in differentiators 88, rectified in rectifiers 90 and summed together at 92 to provide bipolar impulses. The generator outputs either a positive or a negative impulse at every clock transition, regardles of whether there is a data transition, e.g., from a 1 to a 0. Accordingly there is always energy at the clock frequency available in the receiver. The impulses are filtered in partial response filter 26. The output of the partial response filter is summed at 94 with a DC center frequency tuning voltage and with a frequency modulated subcarrier from a frequency modulator 96 (for a purpose which will be described shortly), and the resulting signal is suppled to the control voltage input of VTO 28, which may be Gunn oscillator operating at 23 GHz, for example. The output of the VTO is supplied to an attenuator 98 and to an antenna 100, as shown. If desired, a power amplifier (not illustrated) may be disposed between the VTO and the attenuator.

The receiver may be a dual conversation receiver, as shown, wherein a signal received by antenna 100 is supplied to a mixer 102 driven by a first local oscillator 104 to downconvert the received frequency to a first intermediate frequency (IF). The output of mixer 102 is amplified in a first IF amplifier 106 and supplied to a second mixer 108 driven by a second local oscillator 110 to downconvert the first intermediate frequency to a second intermediate frequency, e.g., 50 MHz. The output of mixer 108 is supplied to a second IF amplifier 112, the gain of which is controlled by an envelope detected non-coherent AGC circuit 114. From IF amplifier 112, the signal is supplied through an attenuator 116 to a 90° hybrid 118. The 0° output of the hybrid is input to the PLL detector 32, which may be as previously described except for the inclusion of a power splitter or 0° hybrid 120 between the VCO output and the phase detector 34. The phase detector is preferably of the sinusoidal type, for reasons previously described, and may comprise a mixer.

The output of the loop filter 36 of the PLL may be input to the output compensator 40 through a band rejection filter 122 formed to block the subcarrier produced by frequency modulator 96. The output of output compensator 40 is supplied to the clock recovery circuit 44, which may comprise a narrow band phase lock loop having a crystal controlled VCO operating at the nominal clock frequency, and to an AC amplifier 124. Since the PLL output is taken from the control voltage input to the VCO, the output signal from output compensator 40 comprises an AC voltage related to the phase error superimposed upon the DC center frequency tuning voltage of the VCO. This DC voltage is blocked by the AC amplifier so that the output of the AC amplifier is the AC component centered about zero volts. The output of the AC amplifier is supplied to an automatic threshold circuit comprising a DC restore circuit (a voltage clamp) 126, a peak hold circuit 128, a DC amplifier with a gain of minus $\frac{1}{2}$, and a summer 132. The output of the summer, which is a bipolar voltage, is supplied to the integrate and dump (I/D) circuit 42, and the output of the I/D circuit is supplied to a bit slicer comprising a differential comparator 138 and a flip-flop 140. The output of the flip-flop is supplied to a descrambler circuit 142, which output the data.

The system of FIG. 11 includes an adaptive power level control subsystem for controlling the transmitted power of a downrange transmitter. Power level control of the downrange transmitter is effected by multiplexing with the transmitted data a subcarrier that is frequency modulated by a low frequency that is related to the received power level from the downrange transmitter. The modulated subcarrier may be produced by a frequency modulator 96, i.e., a VCO, and preferably has a center frequency equal to the bit rate so as to locate the subcarrier in the null between the main and first positive sidelobe of the transmitted RF spectrum, as shown in the normalized frequency response of FIG. 10B. An estimate of the received power level of the downrange transmitter is derived from the output of the envelope detected AGC circuit 114, which controls the gain of the second IF amplifier 112. The AGC voltage is supplied a low frequency voltage-to-frequency converter 150 which produces an output frequency related to the AGC voltage. This output frequency modulates the subcarrier in frequency modulator 96, and the modulated subcarrier is summed in summer 94 with the output from the partial response filter and the VTO center frequency tuning voltage to form a composite voltage that is fed to the VTO control input.

In the downrange receiver (which as noted above is preferably configured similarly to the receiver of FIG. 11), the output of the loop filter of the PLL is filtered by a narrow bandpass filter 160 tuned to the frequency of the subcarrier and is supplied to a subcarrier demodulator 162, which outputs a frequency corresponding to the low frequency modulation from voltage-to-frequency converter 150 that was applied to the subcarrier. This frequency is converted to a voltage in a frequency-to-voltage converter 164 and supplied to a power control circuit 166 which produces an output for controlling attenuator 98.

This power level control subsystem operates in real-time to control transmitted power level. Normally, the system would be configured to operate at a reduced power level under fade-free conditions. When fading occurs, a decrease in received power level is detected as a change in the AGC voltage controlling the gain of the second IF amplifier 112. The AGC voltage is converted to an appropriate frequency by the V/F converter 150, which modulates the subcarrier. Upon the subcarrier being demodulated in the downrange receiver, the modulating frequency is converted to a voltage (in F/V converter 164) which causes the power control circuit of the downrange receiver to reduce the amount of attenuation between the VTO and the antenna, thereby increasing the output power of the downrange transmitter.

The receiver of the system of FIG. 11 also incorporates a coherent AGC circuit for controlling the level of the signals applied to phase detector 34. The coherent AGC circuit comprises a mixer 180 that receives the quadrature output of 90° hybrid 118 and an output from power splitter 120. The output of the mixer is supplied to a low pass filter 182 and to an integrating error amplifier 184 which produces an output voltage representative of the difference between the output of the low pass filter and a reference voltage 186. This output voltage is used to control attenuator 116 so as to maintain constant the level of the signal applied to the phase detector.

The system of FIG. 11 also preferably includes an automatic frequency control (AFC) circuit 190, the output of which is supplied to the second local oscillator 110 through a summer 192 and an integrator 194. AFC circuit 190 serves as a gross automatic frequency control for maintaining the downconverted RF signal within the bandpass of the second IF amplifier. It does not attempt to track the carrier within the IF bandpass. Rather, carrier tracking is performed by PLL 32.

The system may further include a lock indicator circuit 200 that provides an output when the PLL loses lock. The lock indicator circuit is driven by an output from low pass filter 182 of the coherent AGC circuit. If the PLL loses lock, the output of the lock indicator circuit goes high to disable the AFC circuit 190 through an inverter 202 and to enable a sweep circuit 204. The sweep circuit outputs a slow sweep, which may of the order of 2-3% of the bit rate, to summer 192 to cause the second local oscillator to begin sweeping slowly, and outputs a fast sweep, which may be of the order 10% of the bit rate, to the PLL to cause the VCO to begin a fast sweep. Upon the PLL locking to the received carrier, the sweep circuit is disabled and the AFC circuit is re-enabled.

Scrambler 80 and descrambler 142 may comprise, respectively, complementary, self-synchronizing feedback shift registers of, for example, five stages. The purpose of scrambler 80 is simply to ensure a transition on the input to AC amplifier 124 every few milliseconds. Otherwise, for a data input comprising a long string of either 1's or 0's, the output of the amplifier would average to zero volts.

Figure 12:
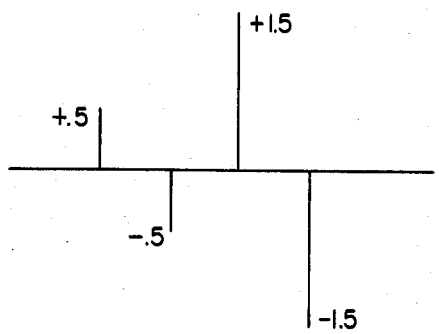
FIG. 12 is a diagrammatic view illustrating the output of a bipolar impulse generator for a 4-level data system.

Although the system of FIG. 11 was described for use with binary data, the system may be readily adapted for use as an m-ary system. For example, for a four-level system, a conventional four-level encoder may be employed for encoding the data output of the scrambler and the bipolar impulse generator may be configured to produce four-level bipolar impulses having two positive levels and two negative levels, as shown, for example, in FIG. 12. Also, the receiver would employ a four-level comparator and decoder for decoding the detected data.

As will be appreciated from the foregoing, because of its simplicity, the system of FIG. 11 may be manufactured rather inexpensively. More significantly, however, the system is readily adaptable to different data rates and to different optimizations of its components simply by changing the time response determining elements of the system, which include the partial response filter, the loop filter/RF bypass of the PLL, and the output compensator. Since these elements merely comprise conventional inductors, capacitors, and RC networks, the system may be conveniently arranged to accept the partial response filter, the loop filter/RF bypass and the output compensator as plug-in components. Accordingly, to change the data rate, the time response, or the optimization of the system, it is merely necessary to replace these plug-in components with appropriate other components. This flexibility significantly reduces the cost of the system. Especially advantageous is the use of a PLL (rather than passive L-C filters) to synthesize the receiver poles, since the PLL not only serves as an efficient low cost data detector that affords threshold extension and minimum detector noise bandwidth, it also serves as a carrier tracker, thereby significantly reducing the stability requirements of VTO 28, LO 104 and LO 110. Furthermore, by using the PLL as a PSK data detector, the necessity for a phase reference in the receiver is avoided. From a performance standpoint, a system such as illustrated in FIG. 11 operating at 1.544 Mb/sec was tested and found to have a performance much better than non-coherent FSK and within several dB of coherent PSK.

While the foregoing has been with reference to particular embodiments, it will be appreciated by those skilled in the art that numerous changes may be made in these embodiments without departing from the principles and the spirit of the invention, the scope of which is defined in the appended claims.

I claim:

1. In a communications system that conveys digital information signals along a signal path that comprises:

a transmitter that includes:
  means for producing bipolar impulse signals from said digital information signals;
  modulation filter means for filtering said bipolar impulse signals to produce filtered, phase modulation signals; and
  modulator means for producing a phase modulated carrier in accordance with the time integral of said phase modulation signals;

a receiver that includes:
  means for receiving said modulated carrier and providing a recovered signal;
  detector means, to which said recovered signal is coupled, comprising a phase lock loop having at least a phase detector, loop filter, and output compensator means to provide estimate signals corresponding to the phase modulation of said recovered signal; and
  means for processing said estimate signals to produce corresponding digital output signals; and a channel, which conveys said modulated carrier from said transmitter to said receiver;

the method of optimizing the characteristics of said transmitter and receiver comprising the steps of:
  specifying an overall transfer function to provide a desired overall time response for the signal path;
  determining a plurality of individual transfer functions that, when concatenated, provide said overall transfer function; and, while providing the desired overall transfer function for said signal path,
  allocating some of said individual transfer functions to the loop filter of the phase lock and to the compensator means to simultaneously minimize the noise bandwidth and optimize the transient response of said phsae lock loop to minimize the carrier to noise ratio necessary in said recovered signal provided to the detector means to achieve a predetermined bit error rate in the digital output signals; and
  allocating the remaining individual transfer functions to said modulation filter so that the phase changes produced in said modulated carrier by said modulator means occur continuously over time intervals substantially equal to the symbol times of said digital signals, thereby taking advantage of the threshold extension properties of phase lock loop detection by maintaining the phase error at the output of said phase detector within the dynamic range of a narrow range phase detector and enabling detection at low carrier to noise ratios.

* * * * *